(12) United States Patent
Su et al.

(10) Patent No.: US 9,210,995 B2
(45) Date of Patent: Dec. 15, 2015

(54) TOOTHBRUSH

(71) Applicant: NAMEI TECHNOLOGY CORPORATION, San Jose, CA (US)

(72) Inventors: Jun Su, Hangzhou (CN); Jiasheng Zhu, San Jose, CA (US)

(73) Assignee: O'NANO ORAL SOLUTIONS, INC., San Jose, CA (US)

( * ) Notice: Subject to any disclaimer, the term of this patent is extended or adjusted under 35 U.S.C. 154(b) by 129 days.

(21) Appl. No.: 13/625,877

(22) Filed: Sep. 25, 2012

(65) Prior Publication Data

US 2014/0082871 A1    Mar. 27, 2014

(51) Int. Cl.

| | | |
|---|---|---|
| A46D 3/00 | (2006.01) |
| A46B 9/04 | (2006.01) |
| A46B 3/00 | (2006.01) |
| A46B 1/00 | (2006.01) |
| A46B 9/02 | (2006.01) |
| B29L 31/42 | (2006.01) |
| B29C 45/14 | (2006.01) |

(52) U.S. Cl.
CPC ... *A46B 9/04* (2013.01); *A46B 1/00* (2013.01); *A46B 3/00* (2013.01); *A46B 3/005* (2013.01); *A46B 9/028* (2013.01); *A46D 3/00* (2013.01); *A46D 3/005* (2013.01); *A46B 2200/1066* (2013.01); *B29C 45/14336* (2013.01); *B29L 2031/425* (2013.01)

(58) Field of Classification Search
CPC .............. A46B 1/00; A46B 3/00; A46B 5/00; A46B 3/005; A46D 3/005; A46D 3/00
USPC ................... 15/179, 181, 182; 300/5, 11, 21
See application file for complete search history.

(56) References Cited

U.S. PATENT DOCUMENTS

| | | | | |
|---|---|---|---|---|
| 1,482,415 | A * | 2/1924 | Seaboyer et al. ............... 300/21 |
| 2,783,490 | A * | 3/1957 | Kutik .............................. 15/187 |
| 2,988,765 | A * | 6/1961 | Solomon ........................ 15/187 |
| 3,192,549 | A * | 7/1965 | Hunt et al. ..................... 15/192 |
| 3,214,778 | A * | 11/1965 | Mathison ..................... 15/244.1 |
| 3,875,608 | A * | 4/1975 | Weiss ............................. 15/193 |
| 4,366,592 | A * | 1/1983 | Bromboz ..................... 15/22.1 |
| 4,916,773 | A * | 4/1990 | McCoy ........................ 15/205.2 |
| 5,158,342 | A * | 10/1992 | Pai ................................ 300/21 |
| 5,318,352 | A * | 6/1994 | Holland ........................ 300/21 |
| 5,483,723 | A * | 1/1996 | Wenzer ........................ 15/193 |
| 5,678,276 | A * | 10/1997 | Ledingham et al. ........... 15/168 |
| 5,964,508 | A * | 10/1999 | Maurer ......................... 300/21 |
| 6,036,277 | A * | 3/2000 | Weihrauch .................... 300/21 |
| 6,045,649 | A * | 4/2000 | Weihrauch ................. 156/272.8 |
| 6,290,303 | B1 * | 9/2001 | Boucherie ........................ 300/5 |

(Continued)

FOREIGN PATENT DOCUMENTS

CN          03232004.3       3/2005

*Primary Examiner* — Michael Jennings
(74) *Attorney, Agent, or Firm* — Chen-Chi Lin (57) ABSTRACT

A method of manufacturing a toothbrush comprises providing an integral head mold configured to simultaneously form bristles and head board in one injection molding process, heating head molding material to a predetermined temperature, filling the integral head mold with the head molding material in an injection molding machine, applying pressure to the integral head mold for a predetermined period and applying a cooling process to the integral head mold to produce a molded integral head. The molded integral head includes bristles molded on a head board.

6 Claims, 10 Drawing Sheets

(56) References Cited

U.S. PATENT DOCUMENTS

| | | | |
|---|---|---|---|
| 6,406,099 B2* | 6/2002 | Boucherie | 300/21 |
| 6,582,028 B2* | 6/2003 | Buchholz | 300/21 |
| 6,695,414 B2* | 2/2004 | Meyer et al. | 300/21 |
| 7,503,093 B2* | 3/2009 | Weihrauch | 15/187 |
| 8,091,172 B2* | 1/2012 | Cox et al. | 15/204 |
| 8,974,221 B2* | 3/2015 | Suenami | 425/563 |
| 2003/0088931 A1* | 5/2003 | Russell et al. | 15/167.1 |
| 2003/0163884 A1* | 9/2003 | Weihrauch | 15/207.2 |
| 2003/0182750 A1* | 10/2003 | Nishida et al. | 15/193 |
| 2004/0103492 A1* | 6/2004 | Kwon et al. | 15/167.1 |
| 2008/0100126 A1* | 5/2008 | Kwon et al. | 300/21 |
| 2008/0174165 A1* | 7/2008 | Russell | 300/21 |
| 2008/0179938 A1* | 7/2008 | Kwon et al. | 300/21 |
| 2008/0313836 A1* | 12/2008 | Hobbs | 15/193 |
| 2011/0023249 A1* | 2/2011 | Boucherie | 15/171 |
| 2011/0088188 A1* | 4/2011 | Ghodsi | 15/143.1 |
| 2011/0258798 A1* | 10/2011 | Naftal | 15/176.6 |
| 2012/0023692 A1* | 2/2012 | Boucherie | 15/207.2 |
| 2012/0174328 A1* | 7/2012 | Moskovich et al. | 15/106 |
| 2012/0272469 A1* | 11/2012 | Kwon et al. | 15/167.1 |

* cited by examiner

TOOTHBRUSH

TECHNICAL FIELD

The example embodiments of the present invention generally relate to a toothbrush, and more particularly to a toothbrush with an integral toothbrush head.

BACKGROUND

Toothbrushes often reside on bathroom counters when not being used. Research has shown that a significant number of germs can accumulate because of the warm and moist environment. These germs can comprise viruses and bacteria that may cause illness. As such, keeping the toothbrush clean would be preferable and various accessory devices (such as tooth brush holders) are designed to do so. In this regard, areas for improving current toothbrushes have been identified. Through applied effort, ingenuity, and innovation, solutions to improve toothbrushes have been realized and are described in connection with embodiments of the present invention.

BRIEF SUMMARY

According to one exemplary embodiment of the present invention, a method of manufacturing a toothbrush comprises providing an integral head mold configured to form bristles and head board in one injection molding process, heating head molding material to a predetermined temperature, filling the integral head mold with the head molding material in an injection molding machine, applying pressure to the integral head mold for a predetermined period and applying a cooling process to the integral head mold to produce a molded integral head. The molded integral head includes a plurality of individually spaced apart bristles integrated on a head board.

According to one exemplary embodiment of the present invention, a toothbrush includes an integral head manufactured by providing an integral head mold configured to form bristles and head board in one injection molding process, heating head molding material to a predetermined temperature, filling the integral head mold with the head molding material in an injection molding machine, applying pressure to the integral head mold for a predetermined period and applying a cooling process to the integral head mold to produce a molded integral head. The molded integral head includes the plurality of individually spaced apart bristles integrated on a head board.

BRIEF DESCRIPTION OF THE DRAWING(S)

Having thus described the example embodiments of the present invention in general terms, reference will now be made to the accompanying drawings, which are not necessarily drawn to scale, and wherein:

FIGS. 7A-10B illustrate variations in the molded bristles according to example embodiments of the present invention.

DETAILED DESCRIPTION

The present disclosure now will be described more fully with reference to the accompanying drawings, in which some, but not all, embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout. The structures of some conventional toothbrushes easily retain and harbor viruses and bacteria in their bristles, cores, the spaces between adjacent cores, and the tightly populated bundles of bristles. This can lead to infection. While a number of accessory devices are available, such as plastic cases, disinfectant devices, etc., which are separate devices from the toothbrushes they protect, embodiments discussed herein are related to toothbrushes and the systems, methods and other means for configuring toothbrushes to reduce the bacteria and viruses that may be passed to the human (or any other type of) user.

Figure 1:
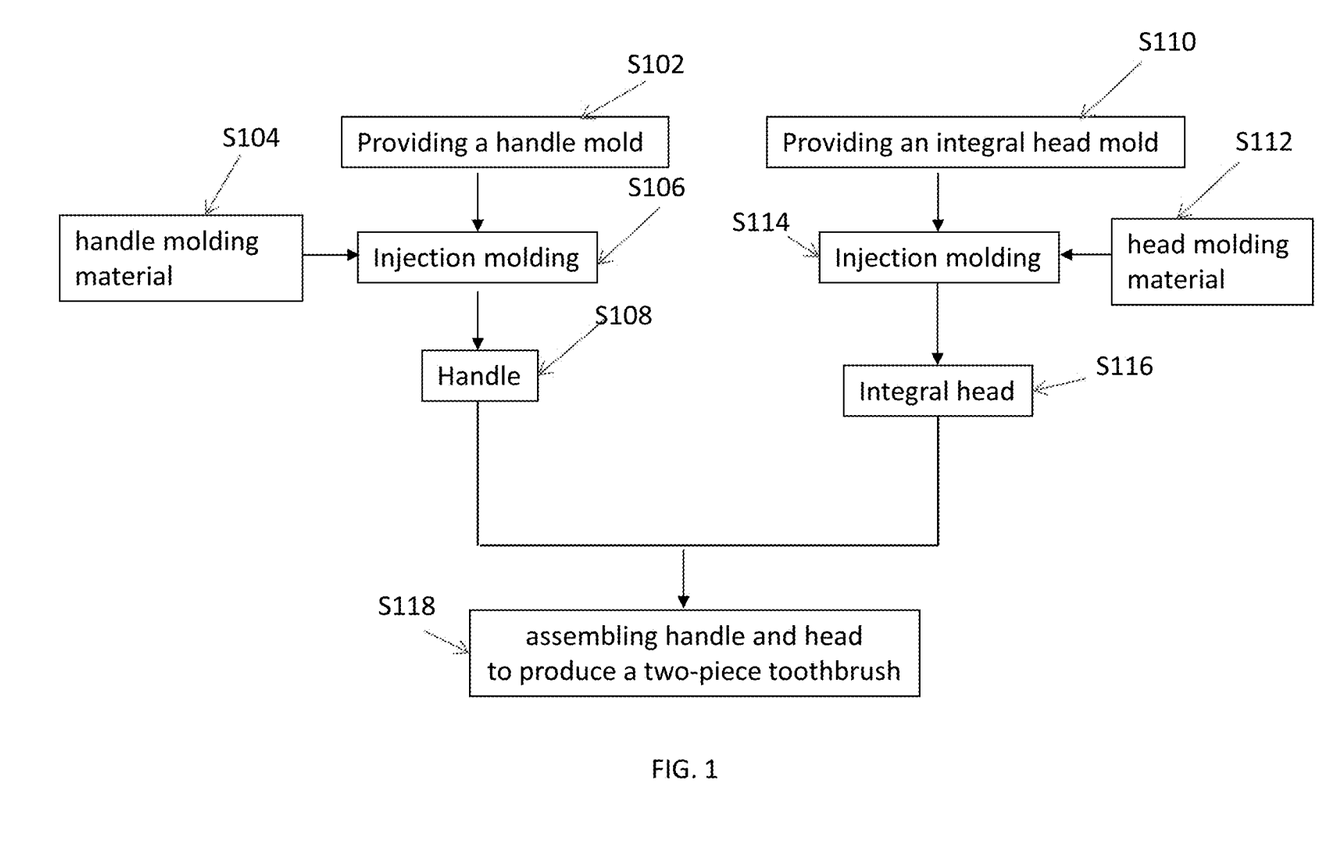
FIG. 1 is a flow chart illustrating a toothbrush manufacturing process according to an example embodiment of the present invention.
Figure 2:
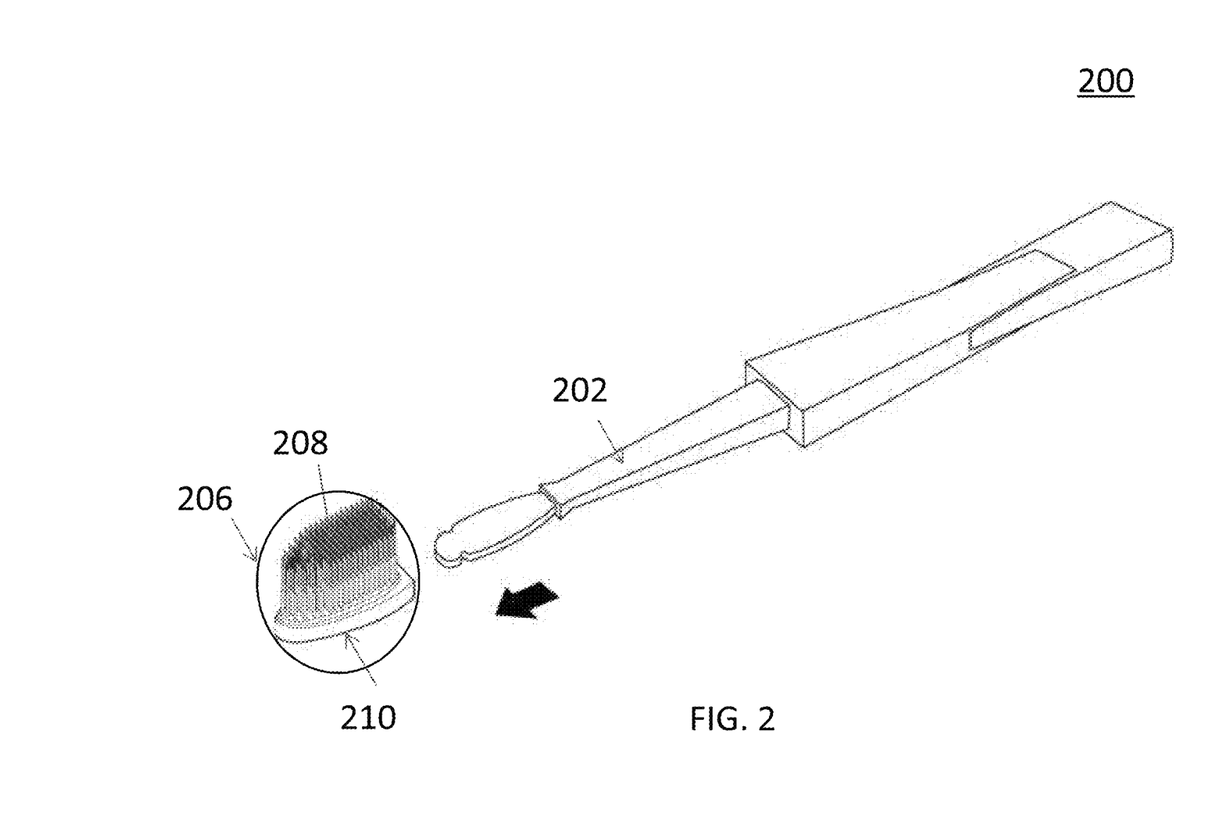
FIG. 2 illustrates a two-piece toothbrush manufactured using the manufacturing process of FIG. 1.

FIG. 1 is a flow chart illustrating a toothbrush manufacturing process according to an example embodiment of the present invention. The manufacturing process may include a handle mold design manufacturing process to provide a handle mold at step S102. The toothbrush handle may be made using any suitable process. For example, the toothbrush handle may be manufactured by placing a handle mold in an injection molding machine for a handle injection molding process. The injection molding machine may heat handle molding material to a predetermined melt temperature to melt the handle molding material at step S104 and then inject the handle molding material into the handle mold by an injection pressure at step S106. In some embodiments, the predetermined melt temperature entering the handle mold may be about 180° C. In handle injection molding process, the injection molding machine may hold the handle mold by a holding pressure for a predetermined period (e.g., about 30 seconds) while the handle molding material cools. Cooling system may maintain the temperature of the handle mold at a predetermined temperature (e.g., 40° C.) by suitable mold cooling techniques, such as water cooling techniques or radiation techniques, to keep the mold at a proper temperature to solidify the handle molding material. Once the handle mold has adequately cooled, a handle, such as a handle 202 as illustrated in FIG. 2, is molded. An ejecting system, such as ejector pins, may push the molded handle mold at step S108. The handle mold may be designed with or without an angle that is intended to make brushing the back teeth easier. Although design of the handle mold is illustrated in FIG. 2, it is not limited to manual toothbrush and production of the handle may be eliminated from the process, such as in the case of producing a head for an electric toothbrush. The handle molding material may be selected from acrylonitrile butadiene styrene, polycarbonate, polystyrene and any other suitable material.

The manufacturing process may also or instead include a head mold design manufacturing process to provide an integral head mold at step S110. The integral head mold may be designed for simultaneously forming bristles, such as bristles 208 shown in FIG. 2, and a head board, such as head board 210 shown in FIG. 2, in one injection molding process. The injection molding machine may heat head molding material to a predetermined melt temperature (e.g., 170° C.) at step S112 and then inject the head molding material into the integral head mold at step S114. Similar to the handle injection molding process described above, in head injection molding process, the injection molding machine may hold the integral head mold for a predetermined period while the head molding material cools. The cooling system may maintain the integral head mold temperature at a predetermined temperature by any appropriate mold cooling techniques. After the integral head mold has adequately cooled, an integral head 206 with a plurality of bristles 208 (shown in FIG. 2) integrated on the head board 210 is formed at step S116. The bristles are individually spaced apart from each other.

In some other embodiments, steps S110-S116 may be performed prior to steps S102-S108. Namely, the integral head may be manufactured prior to manufacturing the handle. In some embodiments, steps S102-S108 and steps S110-S116 may be conducted simultaneously. More generally, any of the steps discussed herein can be reordered, combined and/or divided into a plurality of steps without departing from the spirit of the invention.

Subsequent to the production of the handle and the integral head, the handle and the integral head may be assembled to produce a two-piece toothbrush at step S118, such as two-piece tooth brush 200, shown in FIG. 2, having handle 202 and integral head 206. The head molding material of the integral head 206 may be polyether thermoplastic polyurethane as polyether thermoplastic polyurethane has a unique molecular structure that provides good compression set and high resilience, along with resistance to impacts, abrasions, tears and more. Moreover, polyether thermoplastic polyurethane has a high modulus of elasticity, making it flexible while still retaining its hardness. Polyether thermoplastic polyurethane also has better resistance to solvents. Despite the benefits of polyether thermoplastic polyurethane over other materials, the head molding material of the integral head 206 may also be selected from polyester polyether thermoplastic polyurethane or any other suitable material that may have similar and/or different properties to polyether thermoplastic polyurethane.

Figure 3:
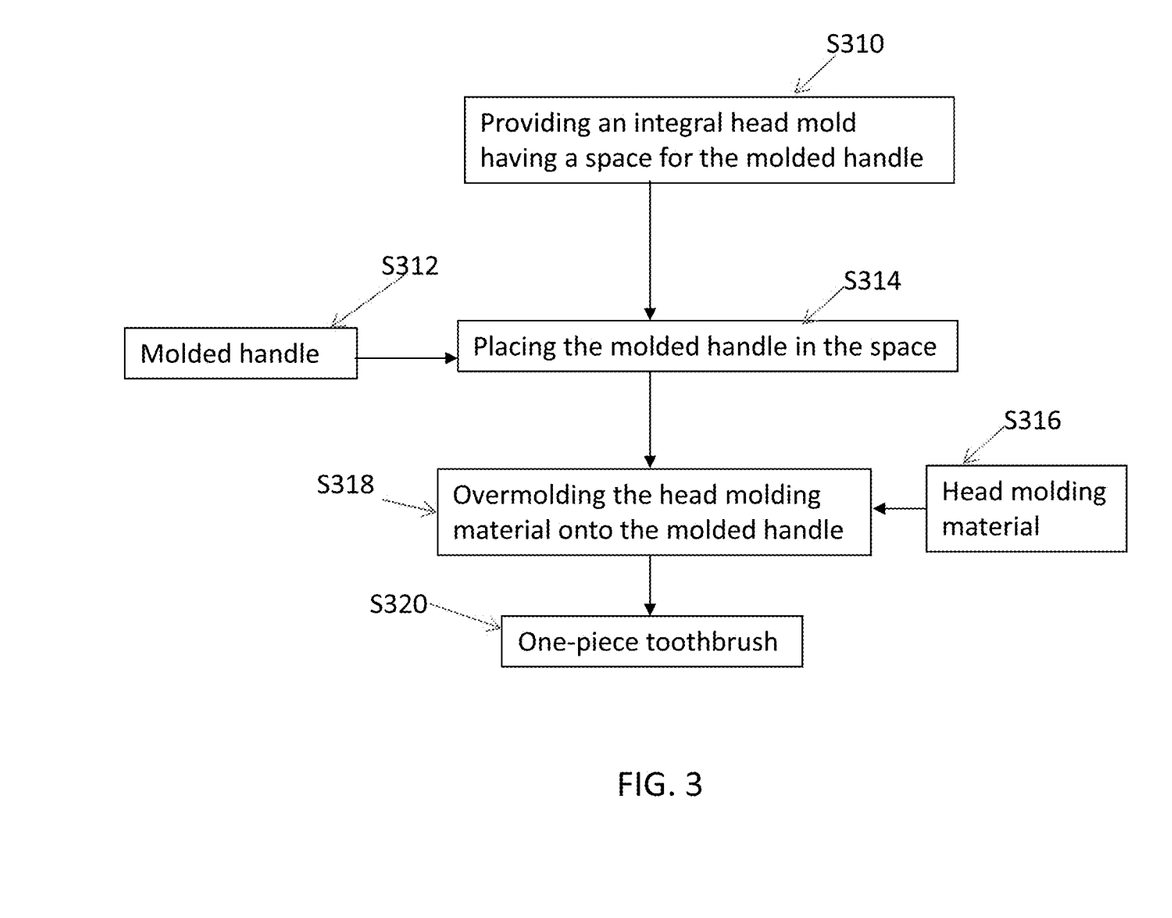
FIG. 3 is a flow chart illustrating a toothbrush manufacturing process according to an example embodiment of the present invention.
Figure 4:
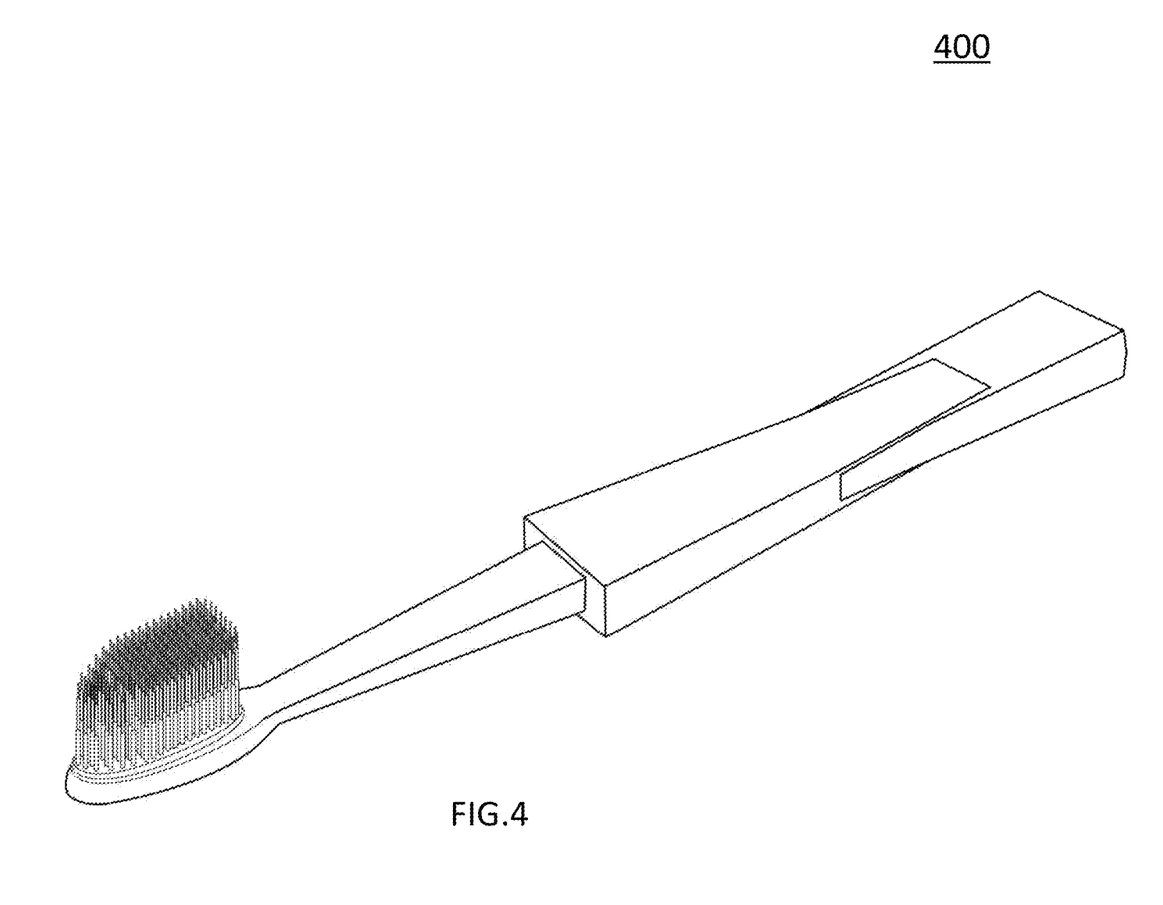
FIG. 4 illustrates a one-piece toothbrush manufactured using the manufacturing process of FIG. 3.

FIG. 3 illustrates a toothbrush manufacturing process according to some example embodiments, in which an integral head mold having a space for receiving a molded handle may be provided at step S310. The handle, such as handle 202 shown in FIG. 2, may be molded at step 312 using process described in steps S102-S108 in FIG. 1. The molded handle may be placed in the space prior to a conduction of an overmolding injection process at step S314. The injection molding machine may prepare the head molding material using heat to melt the head molding material at step S316 and inject the head molding material into the integral head mold in an overmolding injection process at step S318. Since the molded handle has been placed in the space at step S314, the head molding material may be overmolded onto the molded handle. The overmolding injection process may eliminate the space resulting from assembling the handle to the head, as described in FIGS. 1 and 2, thus reducing spaces that may harbor viruses. In this embodiment, the head molding material may be polyether thermoplastic polyurethane. Antivirus additives may be added to the head molding material. The antivirus additives may include nanotechnology organic and/or inorganic materials. Organic (such as antimicrobialpeptides, AMPs) and inorganic (such as nano-silver antimicrobial) antivirus additives may each provide benefits. For example, organic additives may be more effective in defending against viruses. Inorganic additives may be more stable, thus having longer effect than organic additives. Once the integral head mold has been adequately cooled using a suitable cooling technique, a one-piece toothbrush including a head overmolded with a handle is formed at step S320. An exemplary one-piece toothbrush, namely toothbrush 400, is illustrated in FIG. 4.

Figure 5:
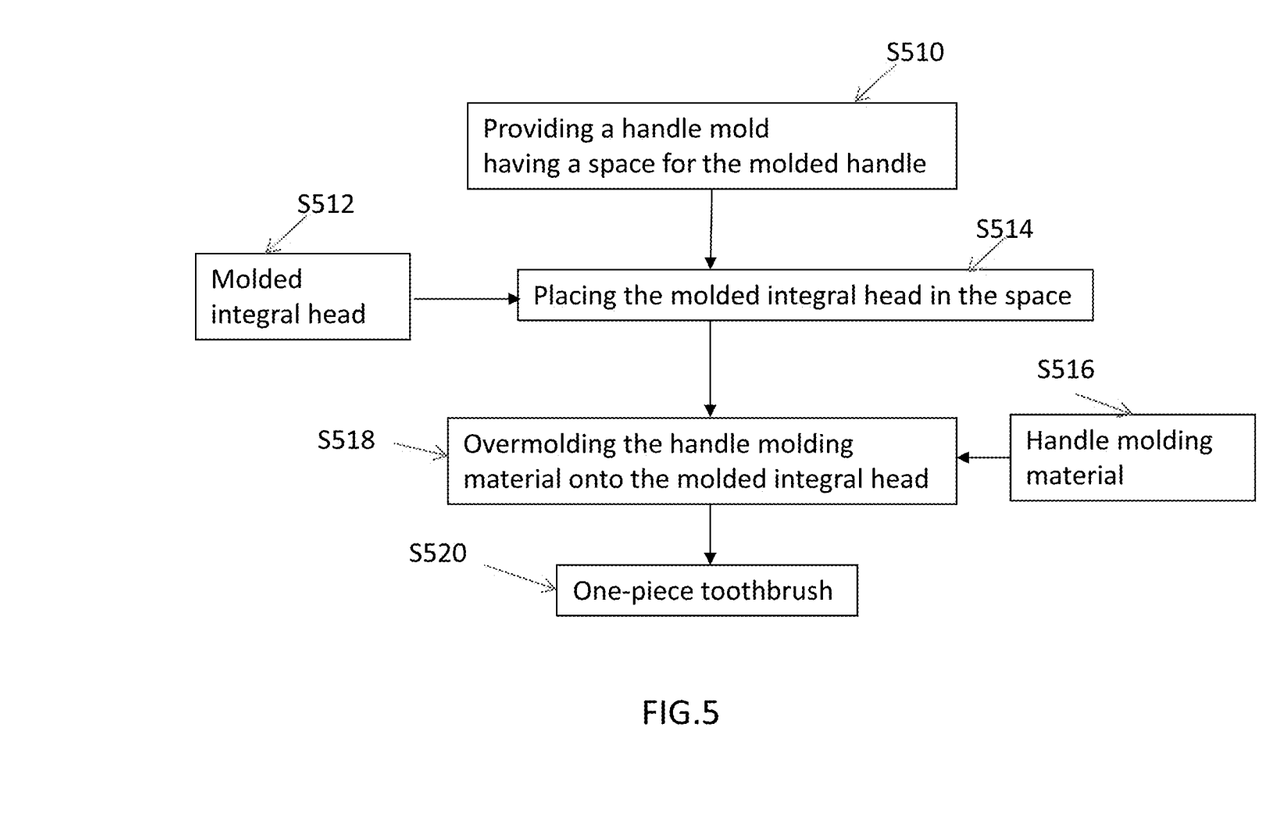
FIG. 5 is a flow chart illustrating a toothbrush manufacturing process according to an example embodiment of the present invention.

FIG. 5 shows another manufacturing process in accordance with some other embodiments, in which a handle mold having a space for receiving a molded integral head may be provided at step S510. The integral head, such as integral head 206 shown in FIG. 2, may be molded at step 512 using process described in steps S110-S116 in FIG. 1. The molded integral head may be placed in the space prior to applying an overmolding injection process at step S514. The injection molding machine may heat and melt the handle molding material at step S516 and then inject the handle molding machine into the handle mold at step S518. Since the molded integral head has been placed in the handle mold at step S514, the melted handle molding material may be overmolded onto the molded integral head at step S518. A one-piece toothbrush, such as toothbrush 400 shown in FIG. 4, is produced at step S520.

Figure 6:
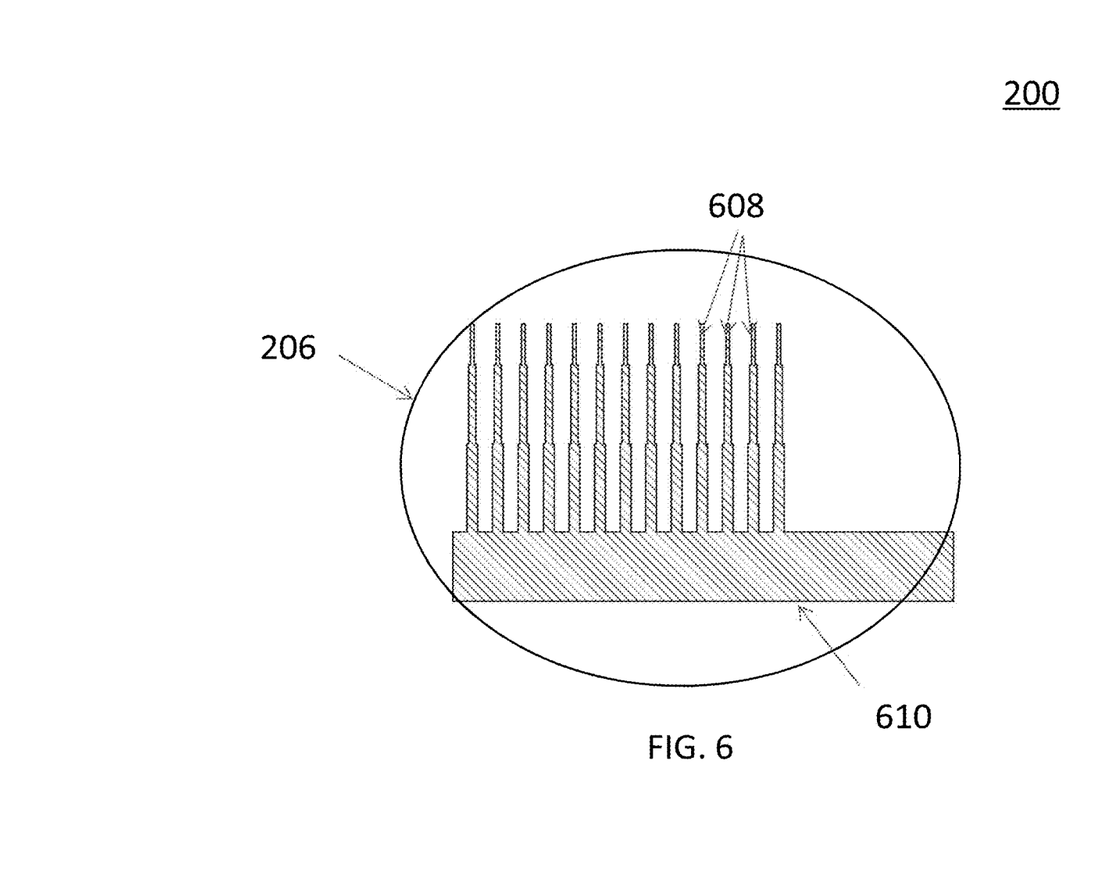
FIG. 6 illustrates a sectional view of a head according to an example embodiment of the present invention.

A sectional view of an integral head, namely integral head 206 as shown in FIG. 2, is illustrated in FIG. 6. In addition to or instead of forming cores on the head board to allow the insertion of bristle bundles, bristles 608 and head board 610 may be simultaneously formed in one injection molding process. More particularly, bristles 608 may not be tightly grouped into bundles and instead could be individually spaced apart from each other. The elimination of some or all of bristle bundles and cores that receive the bundles may aid in reducing spaces in which virus and/or bacteria can live. Hence, toothbrush 200 is an example of a toothbrush configured to reduce the presence of unhealthy microorganisms that may cause disease.

Figure 7A:
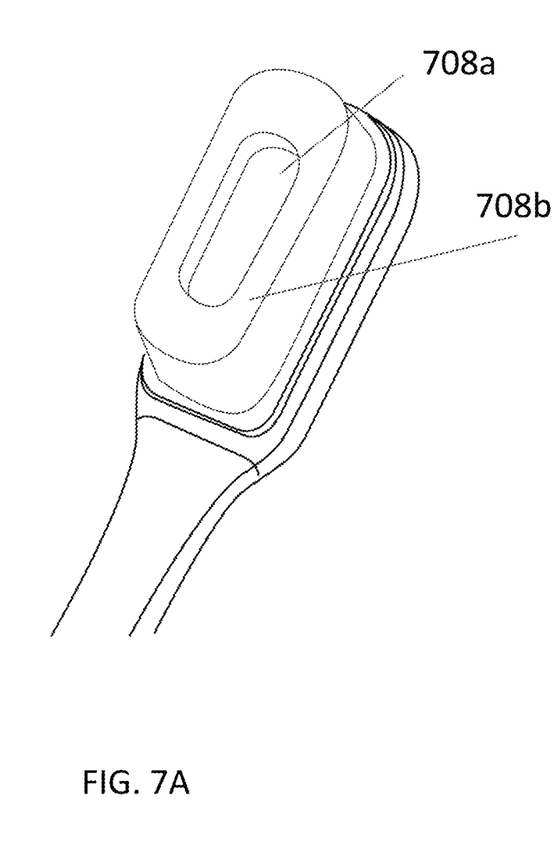
Figure 7B:
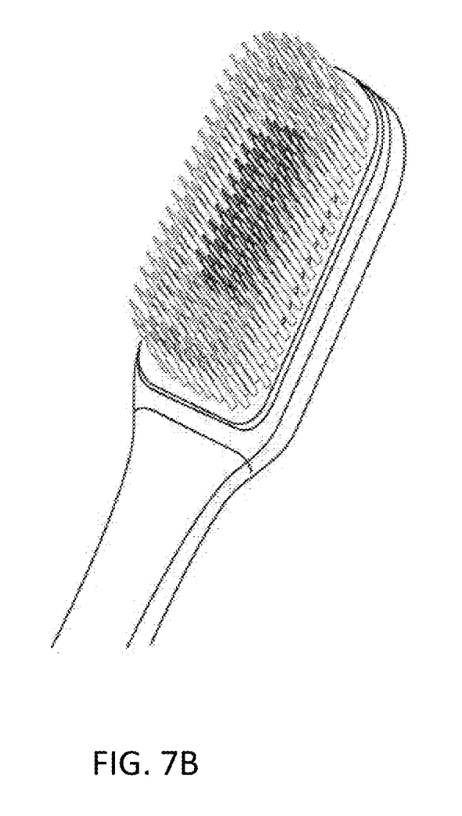

FIGS. 7A-10B illustrate variations in bristles according to example embodiments of the present invention. The bristles may be varied in size, shape and/or molding direction, among other things. FIGS. 7B, 8B, 9B and 10B illustrate bristles distribution according to the respective designs illustrated in FIGS. 7A, 8A, 9A and 10A. As shown in FIG. 7A, the bristles may comprise an inner recess block 708a that is surrounded by an outer ring block 708b. Bristles in the inner recess block 708a may be shorter than those in the outer ring block 708b. Such a design may be especially useful for kids as shorter bristles in the inner recess block 708a may help kids more easily apply the proper amount of toothpaste. The inner recess block 708a may also help to retain the toothpaste on the bristles, thus allowing the toothpaste to adequately clean the teeth. Longer bristles in the outer ring block 708b may adequately and softly rub on the gums, and reach sides of the teeth to deeply clean between the teeth. Straight bristles in the outer ring block 708b may assist in making some people's gums feel more comfortable while brushing the teeth.

Figure 8A:
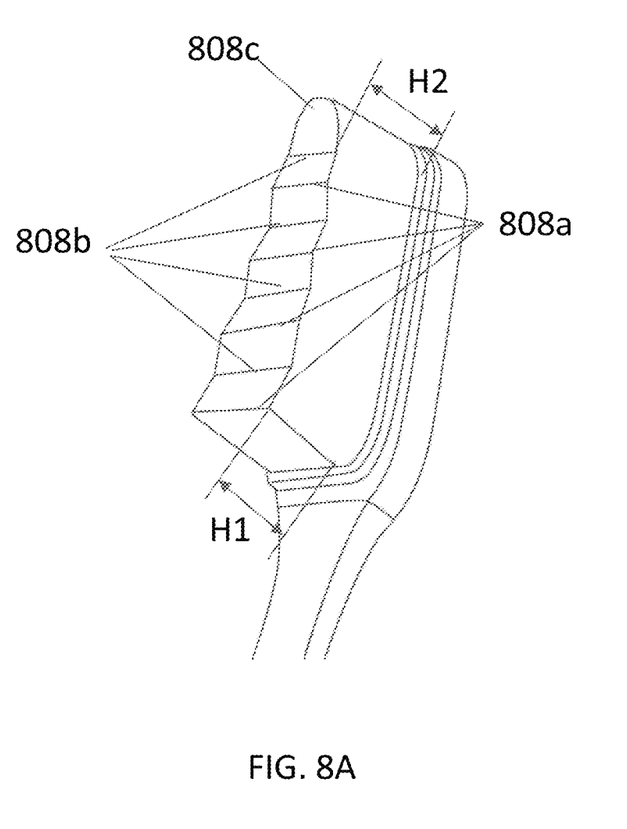
Figure 8B:
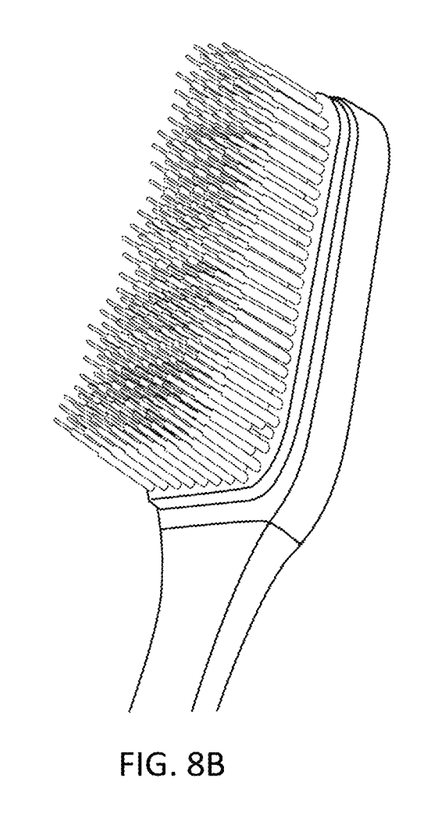

FIGS. 8A and 8B illustrate bristles having different lengths that form a wave-like surface. As shown in FIG. 8B, bristles with height H1 in blocks 808a may form ridge areas that are higher relative to other bristles and may help to deep clean between the teeth. Bristles with height H2 in blocks 808b may be trough areas with bristles that are of relatively low height. Height values increase from the trough areas of bristles in blocks 808b relative to the ridge areas of bristles in blocks 808a. Ridge areas and trough areas may allow the bristles to form a wave-like surface. Bristles on the end of the toothbrush, such as bristles in block 808*c*, may help get behind the back molars. The wave-like surface may be configured to fit the teeth-pattern of certain people and/or groups of people, and may increase the contact area between the teeth and bristles, thus enhancing the cleaning effect.

Figure 9A:
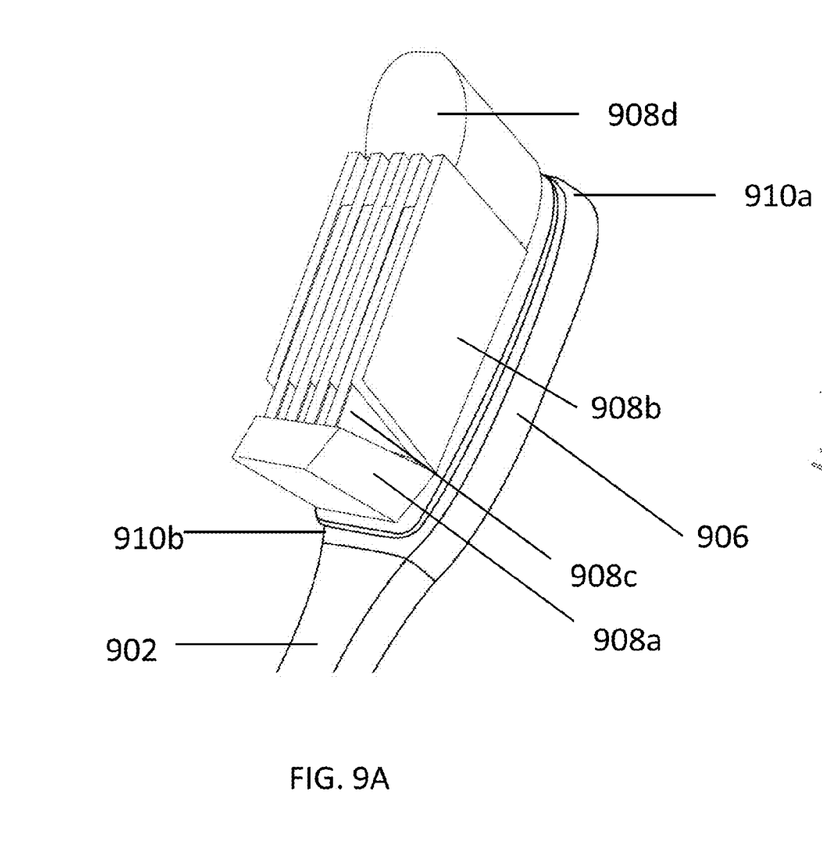
Figure 9B:
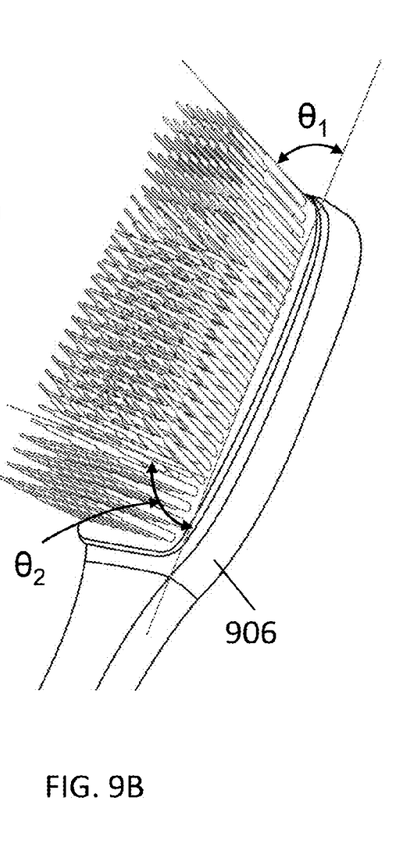

FIGS. 9A and 9B illustrate bristles molded such that the bristles extend in different directions relative to head board 902. For instance, as illustrated in FIG. 9A, bristles in block 908*a* may be approximately perpendicular to head board 906. Bristles in blocks 908*b* may be slightly inclined toward a first end 910*a* of the head board (e.g., away from the handle), while bristles in blocks 908*c* may be slightly inclined toward a second end 910*b* of the head board (e.g., toward the handle). Having bristles extending in different directions may help to deep clean gumlines. More particularly, the basic brushing movements include straightly moving brush back and forth across the teeth. Bristles in a first direction inclined toward the first end 910*a* may help to clean the teeth when brush move toward the back molar. Bristles in a second direction inclined toward the second end 910*b* may help to clean the teeth when brush move away from the back molar. Bristles on the end of the toothbrush, such as bristles in block 908*d*, may be longer towards the end of the head board 906, as shown, and may be easy to reach the back molars to help clean behind the back molars. As shown in FIG. 9B, a first angle $\theta_1$ between the first direction and the head board 906 may be about 45°-90°. A second angle $\theta_2$ between the second direction and the head board 906 may be about 45°-90°.

Figure 10A:
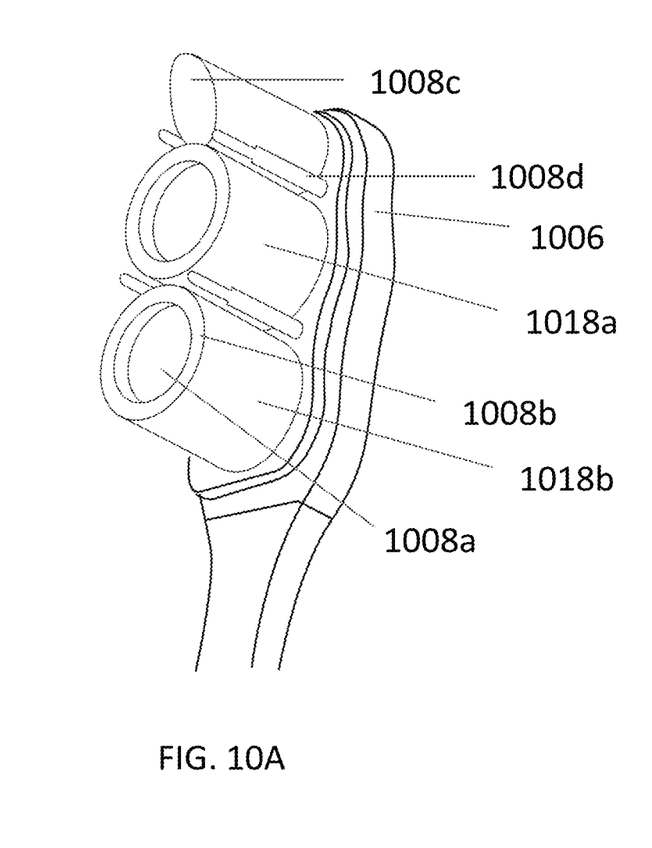
Figure 10B:
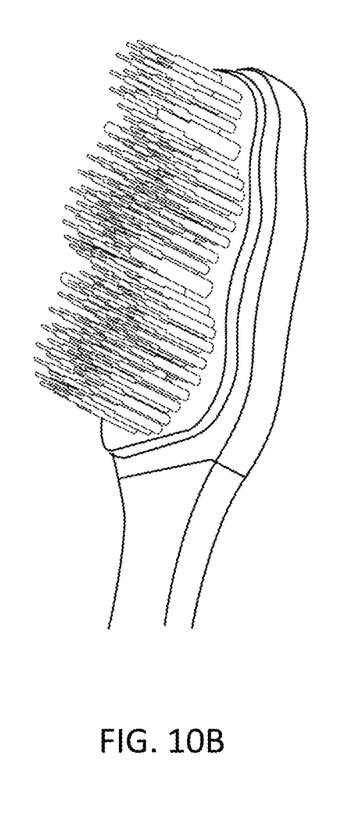

FIGS. 10A and 10B illustrate another example in accordance with some embodiments. Here, bristles in two cup-shaped blocks 1018*a* and 1018*b* are integrated onto head board 1006 in one injection molding process. There may be more than two cup-shaped blocks in other embodiments (e.g., three or four, etc.). Each cup-shaped block may have an inner recess area 1008*a* surrounded by an outer ring block 1008*b*. The outer ring block 1008*b* may be concentrically disposed about the inner recess area 1008*a*. Bristles in the inner recess area 1008*a* may be shorter than those in the outer ring block 1008*b*. Longer bristles in the outer ring block 1008*b* may adequately and softly rub on the gums, and reach sides of the teeth to deeply clean between the teeth. Shorter bristles in the inner recess area 1008*a* may help to clean the tooth surface, which may provide improved cleaning. The inner recess area 1008*a* may help to retain the toothpaste to allow the toothpaste to adequately rub the teeth. Bristles on the end of the toothbrush, such as bristles in area 1008*c*, may be longer towards the end of the head board 1006 and may be easy to reach the back molars to help clean behind the back molars. Bristles 1008*d* may be disposed outside the cup-shaped blocks 1018*a* and 1018*b*. Bristles 1008*d* may be thicker than bristles in cup-shaped blocks 1018*a* and 1018*b*, which may help to massage gums and promote blood circulation.

There are various examples that are not shown by drawings but would be consistent with the embodiments discussed herein. For instance, variations in bristle diameter may yield different bristle hardness and different bristle density. The diameter may be as small as 0.2 mm. The thinner the bristle, the greater the number of bristles that fit on the head board, resulting in the softer bristles and the more contact area with teeth. The cross section of the bristles may be asymmetric, resulting in different bristle hardness in different directions. For instance, bristles extending in the direction perpendicular to the axis of the handle may have greater hardness than those extending in other directions. Each of the examples may eliminate tightly populated bristle bundles, cores that receive the bundles, and the spaces between adjacent cores to reduce spaces in which virus and/or bacteria can live.

Many modifications and other example embodiments set forth herein will come to mind to one skilled in the art to which these example embodiments pertain to having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method of manufacturing a toothbrush, the method comprising:
   providing an integral head mold configured to simultaneously form bristles and a head board in one injection molding process;
   heating head molding material in an injection molding machine to a predetermined temperature to melt the head molding material;
   filling the integral head mold with the melted head molding material;
   applying a holding pressure with use of the injection molding machine to the integral head mold for a predetermined period;
   applying a cooling process using water to the integral head mold to produce a molded integral head,
   wherein the molded integral head includes a plurality of individually spaced apart bristles that are integrated on the head board;
   providing a handle mold;
   heating handle molding material to a predetermined temperature;
   filling the handle mold with the handle molding material;
   applying pressure to the handle mold for a predetermined period; and
   applying a cooling process to the handle mold to produce a molded handle.

2. The method of claim 1, further comprising assembling the molded handle to the molded integral head to produce a two-piece toothbrush.

3. The method of claim 1, further comprising:
   placing the molded handle in a space of the integral head mold; and
   overmolding the head molding material to the molded handle to produce a one-piece toothbrush.

4. The method of claim 1, further comprising:
   placing the molded integral head in a space of the handle mold; and
   overmolding the handle molding material to the molded integral head to produce a one-piece toothbrush.

5. The method of claim 1, further comprising adding nanotechnology antivirus additives into the head molding material.

6. A method of manufacturing a toothbrush, the method comprising:

providing an integral head mold configured to simultaneously form bristles and a head board in one injection molding process;
heating head molding material in an injection molding machine to a predetermined temperature to melt the head molding material;
filling the integral head mold with the melted head molding material;
applying a holding pressure with use of the injection molding machine to the integral head mold for a predetermined period; and
applying a cooling process using water to the integral head mold to produce a molded integral head, wherein the molded integral head includes a plurality of individually spaced apart bristles that are integrated on the head board;
wherein the bristles and the head board are a single part having material continuity and wherein the bristles and the head board are formed in a one-piece construction;
providing a handle mold;
heating handle molding material to a predetermined temperature;
filling the handle mold with the handle molding material;
applying pressure to the handle mold for a predetermined period; and
applying a cooling process to the handle mold to produce a molded handle.

\* \* \* \* \*